March 16, 1965  L. A. HADDOCK, JR., ET AL  3,173,515
BRAKE CONSTRUCTION
Filed Nov. 29, 1962

INVENTORS
LOUIS A. HADDOCK JR.
HENRY J. THOMAS
BY
J.C. Wiessler
ATTORNEY

United States Patent Office 3,173,515
Patented Mar. 16, 1965

3,173,515
BRAKE CONSTRUCTION
Louis A. Haddock, Jr., and Henry J. Thomas, Battle Creek, Mich., assignors to Clark Equipment Company, a corporation of Michigan
Filed Nov. 29, 1962, Ser. No. 240,881
2 Claims. (Cl. 188—75)

This invention relates to brakes and more particularly to a brake having modulation of braking force during engagement and disengagement of the brake.

One of the objects of our invention is to provide an improved brake construction of the type contemplated.

A further object of the invention is to provide an improved brake construction which includes a brake modulating means adapted to cause a gradual application and release of the brake during operation of a brake actuator which is combined therewith.

Another object of our invention is to provide an actuating unit for a brake which embodies improved brake applying modulating means for providing a "soft" or modulated action during application and release of the brake.

In carrying out our invention we have provided in the single disclosed embodiment thereof a normally applied shoe type brake in which a fluid pressure responsive actuator motor includes resilient means for applying the brake and is connected to a fluid pressure source for releasing the brake, and a brake force modulating means is operatively connected between the actuator motor and a brake arm for providing "soft" or gradual brake applying and releasing action.

Figure 1:
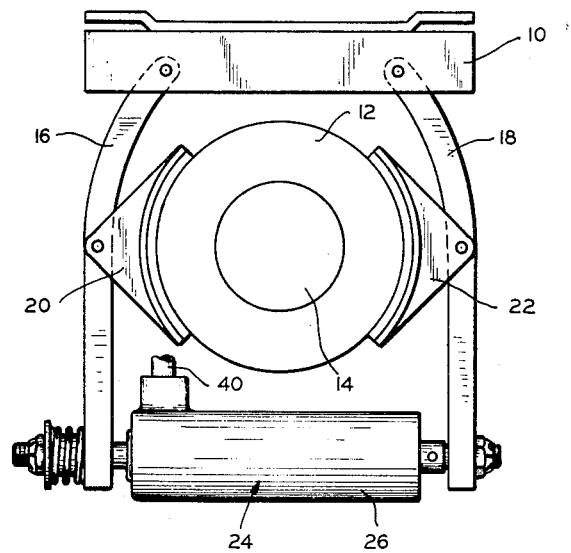
Figure 2:
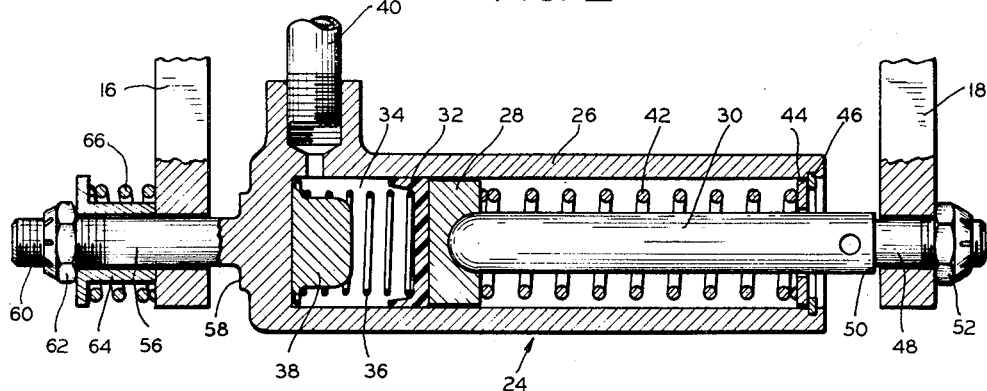

Other objects and advantages of our invention will become apparent from the following description taken in conjunction with the accompanying drawing in which FIGURE 1 is a view of a brake embodying our invention; and FIGURE 2 is an enlarged longitudinal sectional view of the brake actuator motor means for applying and releasing the brake.

Referring to the figures in detail, numeral 10 indicates a support which is positioned to one side of a brake drum 12 secured to a rotatable shaft 14. On opposite sides of the brake drum and pivotally mounted on the support 10 are brake levers or arms 16 and 18 extending beyond the brake drum. Lever 16 has pivotally mounted thereon a brake shoe 20 for cooperation with the drum, and pivotally mounted on lever 18 is a similar brake shoe 22 for cooperation with the drum.

Positioned between and pivotally connected to the non-pivoted ends of the levers is a brake actuating unit generally indicated by the numeral 24, and shown in detail in FIGURE 2. This actuator unit includes a hydraulic pressure responsive cylinder-piston assembly which includes a reciprocable cylinder unit 26 having a reciprocable piston head and rod 28, 30 mounted therein and extending through the right-hand end of the cylinder. A rubber sealing cup 32 is mounted on the left side of piston head 28 and forms with the cylinder a sealed hydraulic pressure chamber 34 in which is mounted a light spring 36 abutting a spring retainer 38 and adapted to maintain sealing cup 32 in abutment with the piston head and in sealing relation with the inner wall of the cylinder. A conduit 40 connects chamber 34 to a valve, not shown, which is operable to communicate the chamber with either a source of hydraulic pressure for releasing the brake or with a fluid sump which vents the chamber, whereupon a heavy brake applying coil spring 42 applies the brake. Spring 42 extends along rod 30 abutting piston head 28 at one end and a spring abutment plate 44 at the other end which is held in position in the cylinder by a snap ring 46.

The right-hand end of rod 30 which extends beyond cylinder 26 includes an extension 48 of reduced diameter forming with the rod a shoulder 50. Extension 48 extends through the end of brake arm 18 which is held in position thereon between shoulder 50 and a lock nut 52.

The left end of cylinder 26 is formed to provide a projecting stem 56 forming with the cylinder wall an abutment shoulder 58 and terminating in a threaded portion 60 upon which is mounted an adjustment lock nut 62. An adjustable sleeve 64 is mounted on extension stem 56 between nut 62 and brake arm 16, through which stem 56 extends, and a brake modulating spring 66 having a lower spring rate than spring 42 is mounted between arm 16 and the annular flange on sleeve 64. It will be noted that a space is provided between cylinder shoulder 58 and the axially inner end of sleeve 64 which is substantially greater than the width of brake arm 16 providing an effective lost motion connection between brake spring 42 and brake arms 16 and 18 during both brake applying and brake releasing action.

In operation, brake shoes 20 and 22 are normally applied to brake the drum 12 and shaft 14 by brake applying spring 42 which tends to pivot arm 16 in a counterclockwise direction about its pivot on support 10 and which tends to pivot lever 18 in a clockwise direction about its pivot on support 10. Such action occurs as the spring 42 tends to actuate cylinder 26 rightwardly, as shown, which applies a braking force to arm 16 through sleeve 64, and tends to actuate piston 28 leftwardly which applies a braking force to arm 18 through lock nut 52. The brake is released upon the introduction of hydraulic pressure fluid to chamber 34 through conduit 40 which overcomes spring 42 thereby forcing piston 28 to the right which causes shoulder 50 of rod 30 to abut arm 18 and actuate it in a brake releasing direction, while actuating cylinder 26 leftwardly until shoulder 58 contacts arm 16 to actuate it in a brake releasing direction. The brake shoes may be again applied to drum 12 by venting pressure fluid in chamber 34 through a selector valve, not shown, to a low pressure sump, whereupon brake spring 42 will again apply braking force as explained above.

It will be noted that modulating spring 66 is compressed fully between arm 16 and the flange of sleeve 64 in the normal brake applied position shown in the figures. If brake release pressure fluid is then communicated to chamber 34 the braking force between the brake shoes and drum is reduced gradually or modulated with a "soft" action as a result of the initial expansion of spring 66 as cylinder 26 moves leftwardly until the shoulder 58 thereof contacts arm 16, at which time spring 66 has expanded an equal distance and the cylinder and piston then actuate the brake arms to fully release the brake shoes.

Re-application of the brake also provides a "soft" action when the pressure fluid is released through conduit 40. Initial rightward movement of cylinder 26 to apply the brake first compresses spring 66 to the position shown wherein the spring is fully compressed, during which compression gradual engagement of brake shoe 20 occurs. After full compression of spring 66 the main brake spring 42 applies full braking action to arms 16 and 18. It will be noted that brake arm 18 also operates with a modulated action since brake spring 42 expands initially to compress spring 66 before full braking force can be applied to either shoe 20 or 22.

It will now be appreciated that we have provided a relatively simple and extremely compact brake actuator assembly wherein the braking force is modulated both during application and release thereof in a manner which minimizes jerkiness in operation of devices with which the brake may be utilized. It provides operators with a braking "feel" which is important to smooth operation of vehicles and other devices.

Various changes and modifications may be made in the structure and relationship of parts of the present invention without in any way departing from the underlying principle thereof. For example, as will be recognized by persons skilled in the art, the brake modulating spring 66 and associated structure may be mounted for similar operation at the outer end portion of piston rod 30 instead of on extension 56 of the cylinder. Also, it will be clear that any suitable resilient or compressible means, such as pneumatic pressure, may be substituted for brake spring 42. In addition, while FIGURE 1 shows the invention utilized in an external brake, it is readily applicable to an internal shoe type brake, and, of course, it is immaterial to the principle of the invention whether the brake is normally engaged or disengaged. The principle of the invention is also readily applicable, as will be clear to persons skilled in the art, in the use of equivalent mechanical linkage elements, for instance, instead of the hydraulic cylinder-piston arrangement. In view of the foregoing, we therefore do not intend to be limited except as defined by the scope and spirit of the claims appended.

We claim:

1. In an external brake having a brake drum, a pair of brake shoes for braking said drum and a pair of opposed brake arms for actuating said brake shoes to engage and disengage the drum, a brake actuator assembly operable to actuate said brake arms comprising a hydraulic cylinder-piston assembly mounted between the brake arms, one of said brake arms being connected to one end of the cylinder element and the other arm being connected to an exposed end of the piston rod element, a brake spring operative between the cylinder and piston elements for actuating the brake arms in opposite directions to normally apply the brake, a chamber formed between the piston and cylinder elements opposite the brake spring and adapted to communicate with fluid pressure for actuating the cylinder and piston elements in directions opposed to the movement thereof urged by the brake spring, means extending from one end of the cylinder-piston assembly, said extending means passing slidably through one of the arms, retaining means connected to said extending means so that one arm is disposed between said retaining means and said assembly, said retaining means being disposed so that the distance from said assembly to the adjacent end of said retaining means is greater than the width of said one arm, and a modulating spring having a lower spring rate than said brake spring disposed between said retaining means and said one arm and tending to bias said one arm into abutment with said assembly, whereby the initial force for applying or releasing the brake is modulated.

2. In an external brake having a brake drum, a pair of brake shoes for braking said drum and a pair of opposed brake arms for actuating said brake shoes to engage and disengage the drum, a brake actuator assembly operable to actuate said brake arms comprising a hydraulic cylinder-piston assembly mounted between the brake arms, one of said brake arms being connected to one end of the cylinder element and the other arm being connected to an exposed end of the piston rod element, a brake spring operative between the cylinder and piston elements for actuating the brake arms in opposite directions to normally apply the brake, a chamber formed between the piston and cylinder elements opposite the brake spring and adapted to communicate with fluid pressure for actuating the cylinder and piston elements in directions opposed to the movement thereof urged by the brake spring, means extending from one end of the cylinder-piston assembly, said extending means passing slidably through one of the arms, a retainer connected to the extending means so that said one arm is disposed between said retainer and said assembly, a sleeve having a radially extending flange adjacent one end thereof, said sleeve being slidably carried by said extending means and disposed between said retainer and said one arm with said flange adjacent said retainer, said retainer being adjustable so that the distance from the other end of said sleeve is greater than the width of said one arm when said one end of said sleeve is in abutment with said retainer, and a compression spring having a lower spring rate than said brake spring, said compression spring being carried by said sleeve and disposed between said flange and said one arm so that it tends to bias said one arm into abutment with said assembly, whereby the initial force for releasing or applying the brake is modulated.

References Cited in the file of this patent
UNITED STATES PATENTS

| | | |
|---|---|---|
| 1,017,011 | Mead | Feb. 13, 1912 |
| 1,166,725 | Trezise | Jan. 4, 1916 |
| 1,308,460 | Waldon | July 1, 1919 |
| 1,386,559 | Fegely | Aug. 2, 1921 |
| 1,445,698 | McGoldrick | Feb. 20, 1923 |
| 1,795,719 | Hardison | Mar. 10, 1931 |
| 1,803,550 | Garrigus et al. | May 5, 1931 |
| 1,841,696 | Andres | Jan. 19, 1932 |
| 2,336,841 | Brimble | Dec. 14, 1943 |